(12) United States Patent
Slovesko (10) Patent No.: US 10,559,794 B1
(45) Date of Patent: Feb. 11, 2020

(54) BATTERY SEALING ENCLOSURE

(71) Applicant: Byton Limited, Hong Kong (HK)

(72) Inventor: Shawn Slovesko, Santa Clara, CA (US)

(73) Assignee: BYTON LIMITED, Hong Kong (HK)

( * ) Notice: Subject to any disclaimer, the term of this patent is extended or adjusted under 35 U.S.C. 154(b) by 0 days.

(21) Appl. No.: 16/172,551

(22) Filed: Oct. 26, 2018

(51) Int. Cl.
   *H01M 2/08* (2006.01)
   *H01M 2/10* (2006.01)
   *B60L 58/21* (2019.01)

(52) U.S. Cl.
   CPC ........... *H01M 2/1083* (2013.01); *B60L 58/21* (2019.02); *H01M 2/08* (2013.01)

(58) Field of Classification Search
   CPC .... H01M 2/1083; H01M 2/1077; H01M 2/08; B60L 58/21; B60L 50/50; B60L 50/60; B60L 50/64; B60L 50/66
   USPC ....................................................... 180/68.5
   See application file for complete search history.

(56) References Cited

U.S. PATENT DOCUMENTS

| | | | | |
|---|---|---|---|---|
| 1,173,616 | A * | 2/1916 | Stone ...................... | B60R 16/04 |
| | | | | 180/68.5 |
| 9,281,505 | B2 * | 3/2016 | Hihara ..................... | B60K 1/04 |
| 10,173,511 | B2 * | 1/2019 | Hara ........................ | B60K 1/04 |
| 10,336,211 | B2 * | 7/2019 | Kobayashi .......... | H01M 2/1077 |
| 2018/0269447 | A1 * | 9/2018 | Olfermann ............... | B60K 1/04 |

\* cited by examiner

*Primary Examiner* — John D Walters
(74) *Attorney, Agent, or Firm* — Womble Bond Dickinson (US) LLP (57) ABSTRACT

Embodiments are disclosed of a battery enclosure for a vehicle. The battery enclosure includes a rigid frame forming a perimeter of the enclosure. The rigid frame has a T-shaped cross section including a web and a flange. The flange has a pair of flange sections that project away from the centerline of the web. A bottom panel having an inner side and an outer side is positioned within the perimeter formed by the rigid frame so that the outer side of the bottom panel rests on one of the pair of flange sections. A perimeter edge of the bottom panel is positioned in a corner formed by the web and the flange section on which the bottom panel rests. A seal is positioned in the corner formed by the inner side of the bottom panel and the web, and a joiner couples the bottom panel to the flange section on which the bottom panel rests.

26 Claims, 6 Drawing Sheets

BATTERY SEALING ENCLOSURE

TECHNICAL FIELD

The disclosed embodiments relate generally to vehicles, and in particular, but not exclusively, to a sealed battery pack enclosure for an electric vehicle.

BACKGROUND

Gas-powered vehicles are slowly being replaced by vehicles that electrically powered, either partially or wholly. Until now the move to electrically-powered vehicles has been limited to passenger vehicles, but manufacturers like Tesla already have commercial vehicles such as trucks in the works. Some governments have mandated a complete transition to electrically powered vehicles by a certain year.

In electric vehicles, whether partially or fully electric, batteries take up a substantial amount of space in the vehicle platform, meaning that in many cases they cannot be positioned remotely from the passenger compartment. As a result, the batteries are usually put in some sort of sealed enclosure. This ensures that the batteries are protected from water, dirt, and impact from objects hitting the vehicle, and also that the vehicle occupants are protected from unusual events such as leaking batteries or battery overheating.

SUMMARY

Embodiments of a battery enclosure include a rigid frame forming a perimeter of the enclosure. The rigid frame has a T-shaped cross section including a web and a flange. The flange has a pair of flange sections that project away from the centerline of the web. A bottom panel having an inner side and an outer side is positioned within the perimeter formed by the rigid frame so that the outer side of the bottom panel rests on one of the pair of flange sections. A perimeter edge of the bottom panel is positioned in a corner formed by the web and the flange section on which the bottom panel rests. A seal is positioned in the corner formed by the inner side of the bottom panel and the web, and a joiner couples the bottom panel to the flange section on which the bottom panel rests.

Embodiments of a vehicle include a vehicle platform for an electric vehicle. A battery pack is coupled to a lower part the vehicle platform. The battery pack includes battery modules positioned in a battery enclosure. The battery enclosure includes a rigid frame forming a perimeter of the battery enclosure, the rigid frame having a T-shaped cross section including a web and a flange joined to an end of the web and having a pair of flange sections that project away from the centerline of the web. A bottom panel having an inner side and an outer side is positioned within the perimeter formed by the rigid frame so that the outer side of the bottom panel rests on one of the pair of flange sections and so that a perimeter edge of the bottom panel is positioned in a corner formed by the web and the flange section on which the bottom panel rests. A seal is positioned in the corner formed by the inner side of the bottom panel and the web, and a joiner to couple the bottom panel to the flange section on which the bottom panel rests.

Embodiments of a process include coupling a bottom panel to a rigid frame that forms a perimeter of a battery enclosure. The rigid frame has a T-shaped cross section including a web and a flange joined to an end of the web, and the flange has a pair of flange sections that project away from the centerline of the web. The bottom panel has an inner side and an outer side and is positioned within the perimeter formed by the rigid frame so that the outer side of bottom panel rests on one of the pair of flange sections and so that a perimeter edge of the bottom panel is positioned in a corner formed by the web and the flange section on which the bottom panel rests. A seal is positioned in the corner formed by the inner side of the bottom panel and the web, and a joiner to couple the bottom panel to the flange section on which the bottom panel rests.

BRIEF DESCRIPTION OF THE DRAWINGS

Non-limiting and non-exhaustive embodiments are described with reference to the following figures, wherein like reference numerals refer to like parts throughout the various views unless otherwise specified.

FIGS. 3A-3C together illustrate an embodiment of a battery enclosure for an electric vehicle.

DETAILED DESCRIPTION

Embodiments are described of a battery enclosure for an electric vehicle. The battery enclosure has a rigid frame that forms a perimeter of the enclosure. The rigid frame has a T-shaped cross-section with a web and a flange having two flange parts projecting away from the web. A bottom panel is positioned with in the perimeter formed by the frame so that the panel rests on one of the flange parts and the perimeter edge of the bottom panel is positioned in the corner formed by the web and the flange part on which it rests. The perimeter edge is sealed by putting a seal at the corner formed the web and the inner surface of the bottom pane, and the bottom panel is secured to the frame by putting a joiner at the corner formed by the outer side of the bottom panel and the end of the flange on which the bottom panel rests.

Figure 1:
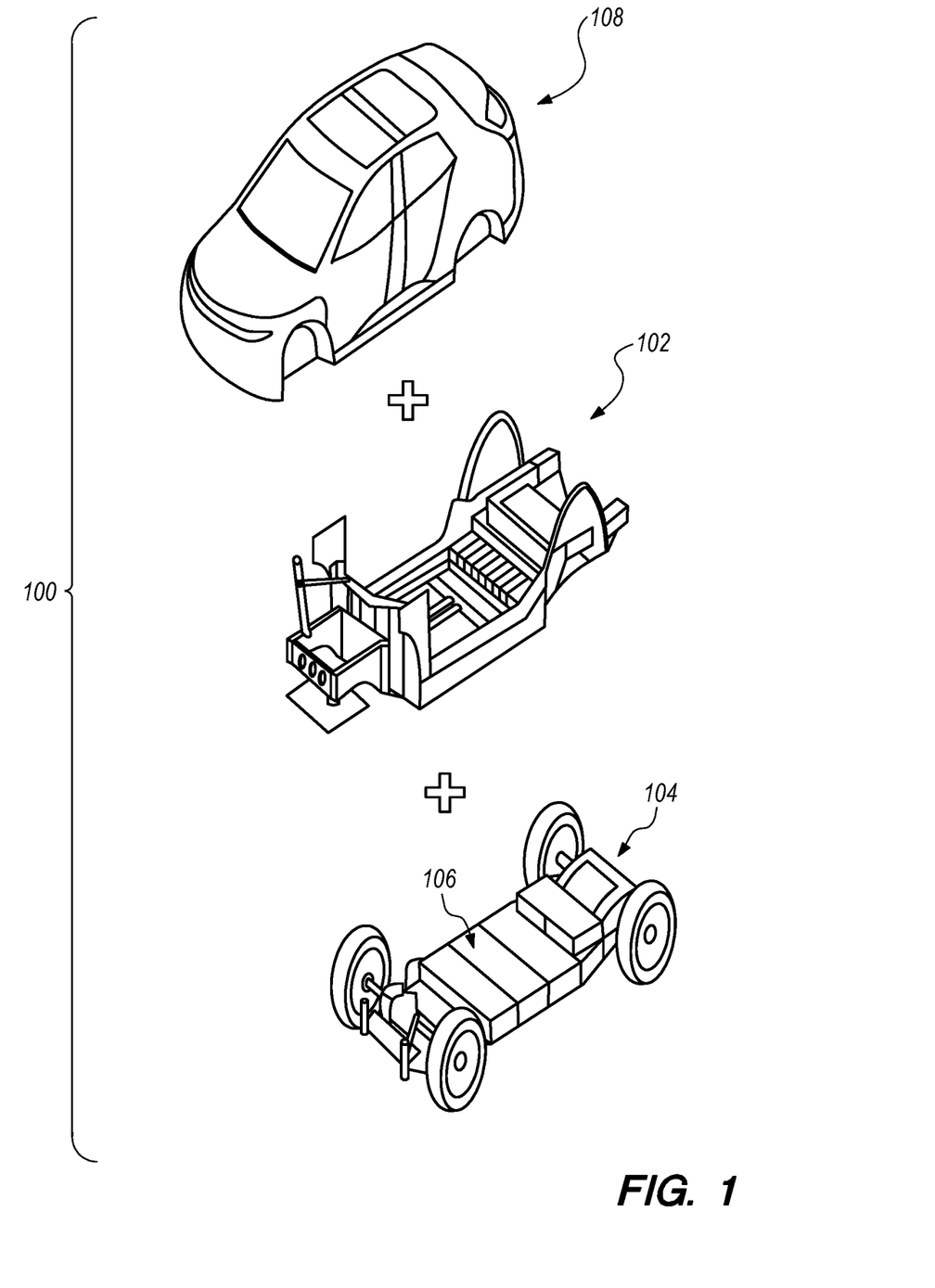
FIG. 1 is an exploded view of an embodiment of an electric vehicle.
Figure 2:
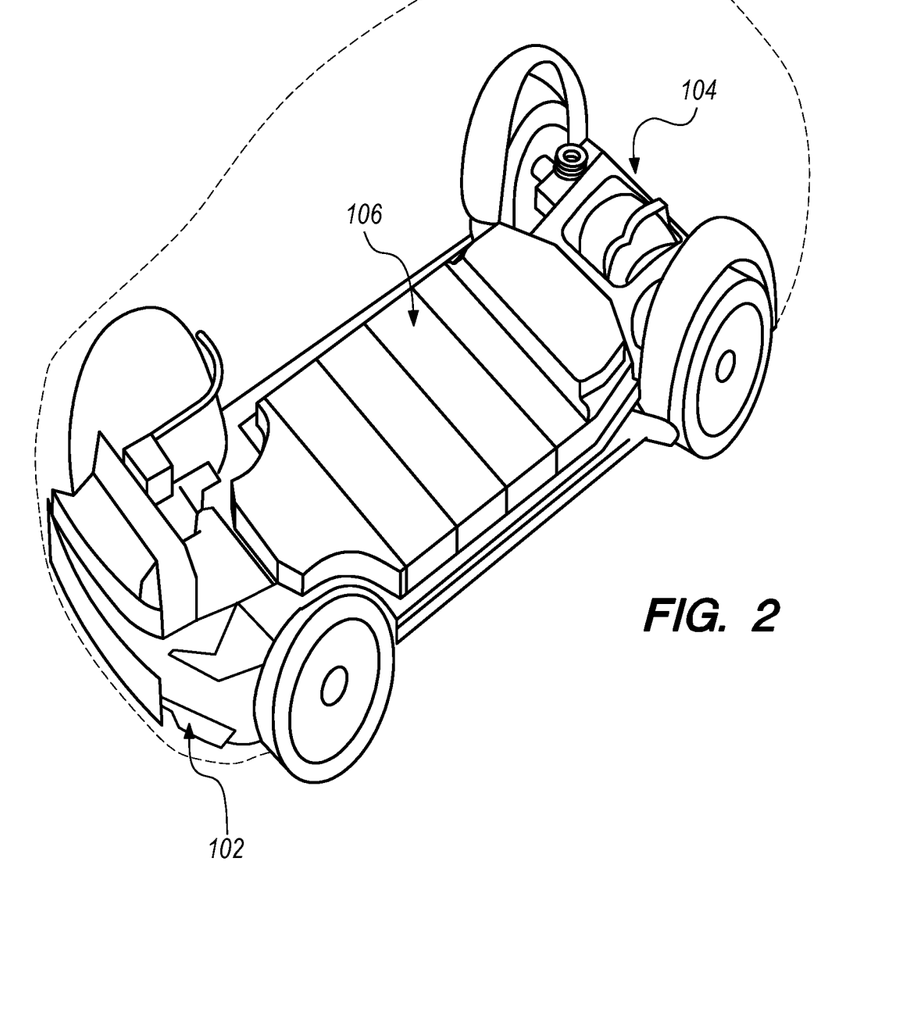
FIG. 2 is a perspective view of an assembled embodiment of a vehicle platform, power train, and battery pack for an electric vehicle.

FIGS. 1-2 illustrate an embodiment of an electric vehicle 100. Vehicle 100 includes a vehicle platform 102, a drivetrain 104 with a battery pack 106, and a body 108. In an assembled vehicle, platform 102 is placed on top of drivetrain 104 and battery pack 106; put differently, battery pack 106 and drivetrain 104 are inserted into the underside of vehicle platform 102. Vehicle body 108 is then fixed in position on top of vehicle platform 102. FIG. 2 illustrates a partially-assembled embodiment of electric vehicle 100, with drivetrain 104 and battery pack 106 in their operational positions within platform 102, battery pack 106 having been inserted through the bottom of platform 102 and bolted or otherwise fixed into position on the vehicle platform.

Figure 3A:
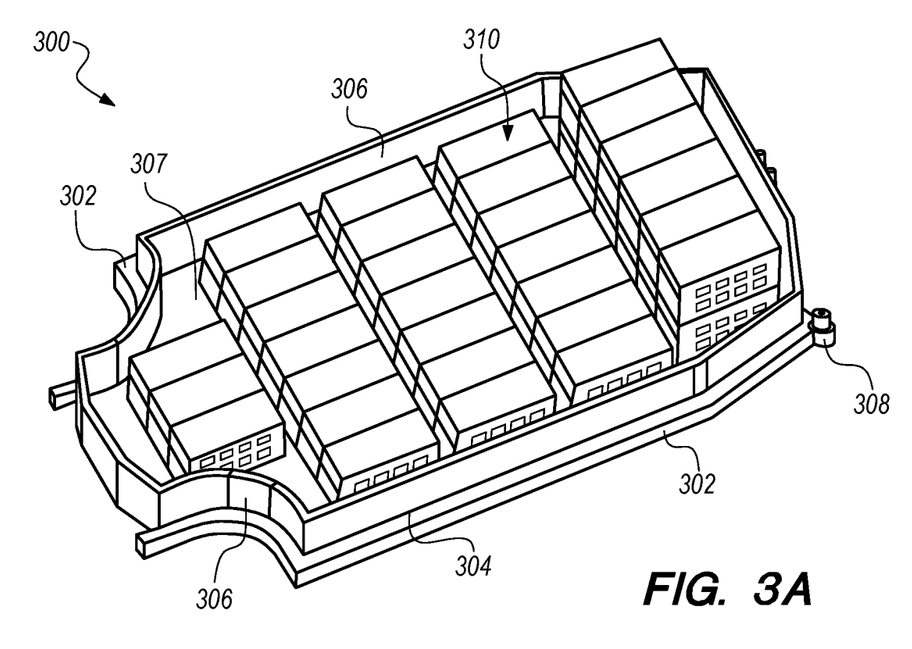
FIG. 3A is a perspective view, FIG. 3B a plan view, and FIG. 3C a cross-sectional view taken substantially along section line C-C in FIG. 3B.
Figure 3B:
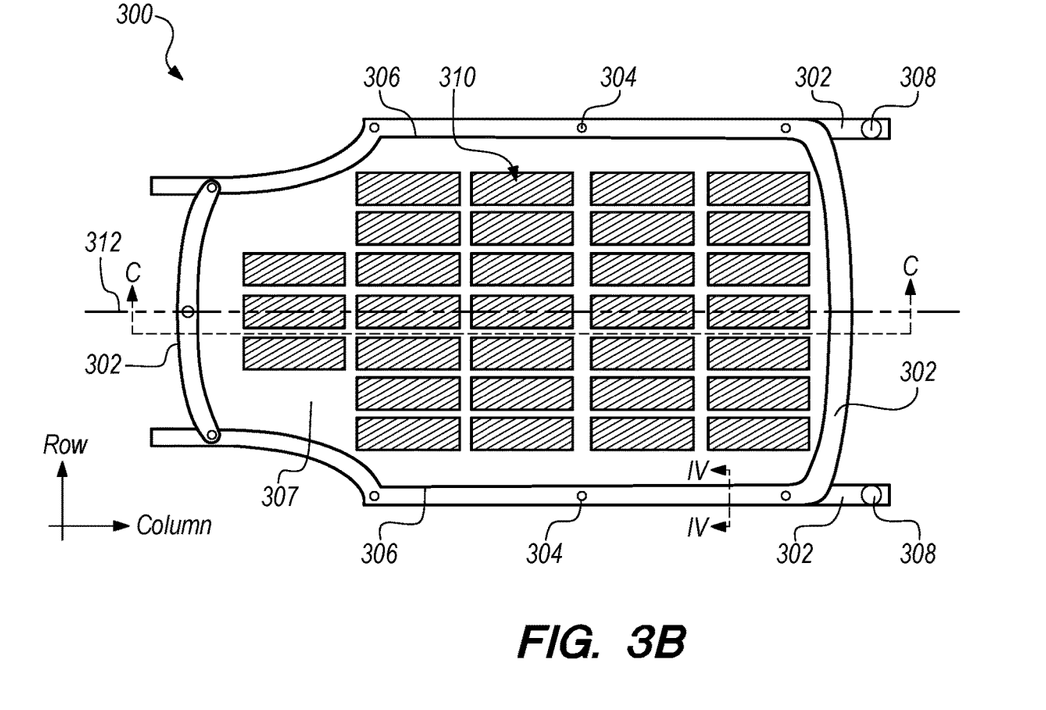
Figure 3C:
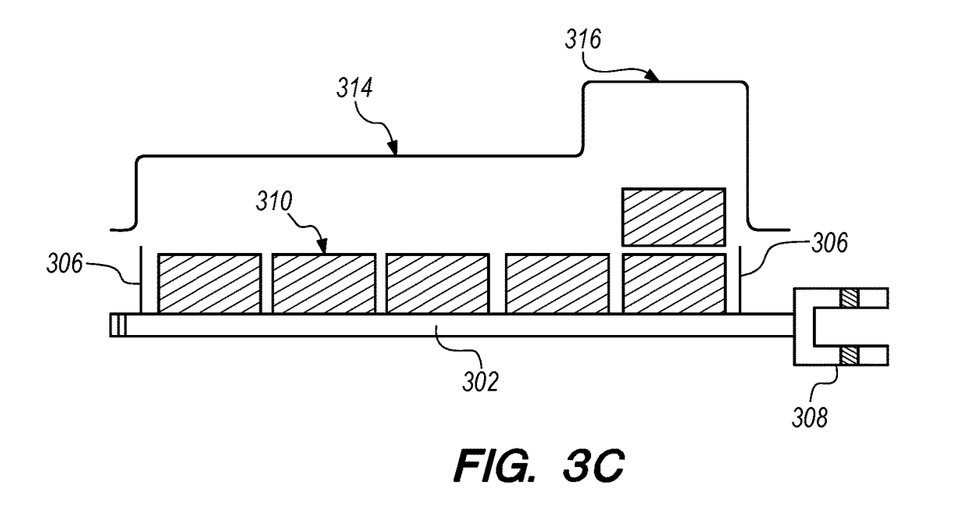

FIGS. 3A-3C together illustrate an embodiment of a battery pack 300 for electric vehicle 100. FIG. 3A is a perspective view, FIG. 3B a plan view, and FIG. 3C a cross-sectional view. Battery pack 300 includes a battery enclosure with battery modules 310 inside. A rigid frame 302 surrounds and forms the perimeter of the battery enclosure. Holes 304 allow rigid frame 302, and hence the entire battery pack, to be attached to the bottom of vehicle platform 102. A substantially planar high-strength rigid plate is fastened to rigid frame 302 to form the bottom panel 307 of the battery enclosure and, when the battery enclosure is installed on the vehicle, bottom panel 307 forms the bottom of the vehicle. Bottom panel 307 is made from a high-strength material so that battery modules 310 are protected from damage during operation of vehicle 100. A sidewall 306 that is substantially perpendicular to bottom panel 307 is also positioned around the perimeter of the battery enclosure to form a sort of pan within which battery modules 310 can be placed. Attachment points 308 are formed at the rearmost extremity of rigid frame 302 to allow the battery enclosure to be attached to other vehicle components such as the vehicle's rear suspension sub-frames, thus taking advantage of the battery enclosure's structural strength to take up loads from other parts of vehicle 100.

A plurality of battery modules 310 are positioned on bottom panel 307 within the perimeter formed by sidewall 306. Battery modules 310 are organized in rows and columns. As shown in FIG. 3B, in the illustrated embodiment the rows run perpendicular to battery pack axis 312, while the columns run parallel to axis 312. In the illustrated embodiment there are seven columns and five rows. Each column has four rows, except the three middle columns, which each have five rows. Put differently, each row has seven columns except for the row closest to the front of the battery pack, which has only three columns (i.e., only three battery modules 310). In every row, the battery modules are rectangular and are positioned with their longest dimension aligned with axis 312.

FIG. 3C further illustrates the arrangement of battery modules 310 inside the battery enclosure. FIG. 3C is a cross-section taken substantially along section line C-C in FIG. 3B. In some embodiments, all the battery modules 310 need not be positioned directly on bottom panel 307, but some can instead be stacked on top of other battery modules. In the illustrated embodiment, the battery modules in the rearmost row form a stack two modules high, but in other embodiments with stacked battery modules the stacks can have three or more modules. In other embodiments, rows other than, or in addition to, the rearmost row can be stacked, and not every column within each row must be stacked. In still other embodiments there need be no battery module stacking at all. After all the necessary battery modules are positioned in the battery enclosure, a lid 314 can be attached to rigid frame 302 around its perimeter for form a sealed enclosure for the battery modules. Where battery stacking is present, such as in the illustrated embodiment, lid 314 can include a part 316 shaped to accommodate the battery module stacking.

Figure 4:
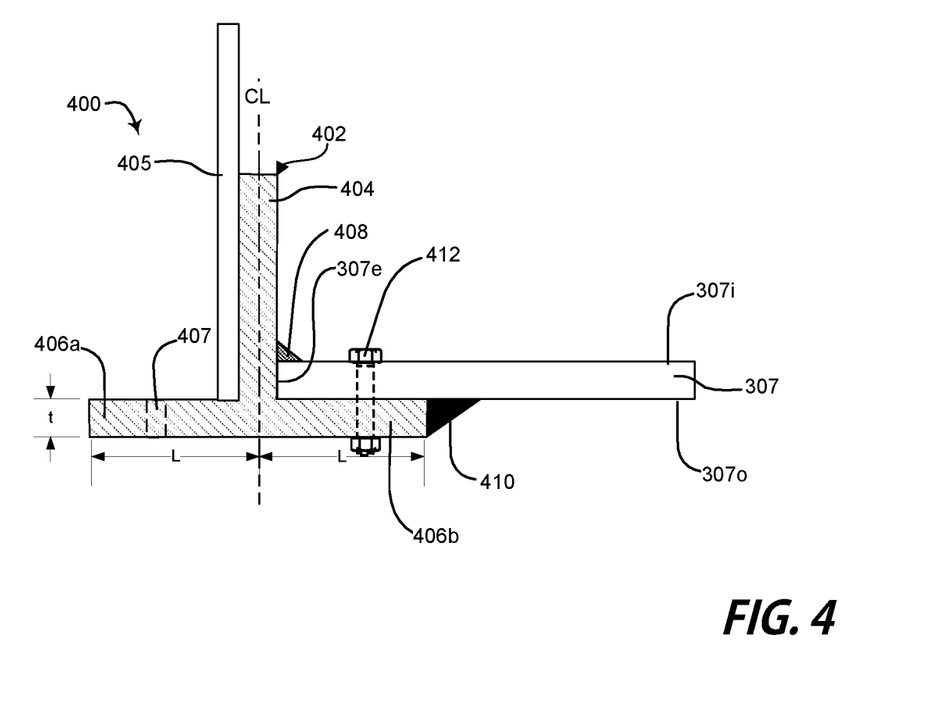
FIG. 4 is a cross sectional view of an embodiment of the rigid frame of the battery enclosure of FIGS. 3A-3C, the cross-section being taken substantially along section line IV-IV in FIG. 3B.

FIG. 4 illustrates an embodiment of a rigid frame 400 that can be used as rigid frame 302 in battery pack 300. FIG. 4 is a cross-section taken substantially along section line IV-IV in FIG. 3B. Frame 400 has a T-shaped cross section 402 with a web 404 and a flange 406. In one embodiment web 404 can form sidewall 306 of the battery enclosure, but in other embodiments sidewall 306 can be a separate component 405 attached to web 404 or to some other part of frame 400.

Flange 406 includes a pair of flange parts 406a and 406b that project away from centerline CL of web 402. In the illustrated embodiment, flange parts 406a and 406b are of substantially equal length L and of substantially equal thickness t, but in other embodiments flange parts 406a and 406b need not have the same length or thickness (see FIG. 5). Flange part 406a can include one or more holes 407 that can be used to attach the battery enclosure to a vehicle platform (see FIGS. 1-2) or can be used to attach a lid to battery enclosure (see FIG. 3C).

Bottom panel 307 has an inner side 307i (i.e., a side that forms part of the interior of the battery enclosure) and an outer side 307o (i.e., a side that forms a part of the exterior of the battery enclosure). Outer side 307o rests on flange part 406b so that the perimeter edge 307e of bottom panel 307 abuts web 404 and is positioned in the corner formed by web 404 and flange part 406b. In other embodiments, perimeter edge 307e of bottom panel 307 is positioned in the corner formed by web 404 and flange part 406b, but it need not abut web 404 so that there can be a gap between perimeter edge 307e and web 404.

A seal 408 is positioned in the corner formed by inner side 307i and web 404. In one embodiment seal 408 can be a rubber gasket, O-ring or other type of pre-formed seal, but in other embodiments seal 408 can be formed by dispensing a sealant into the corner and allowing it to dry, harden, and/or cure. In embodiments where there is a gap between perimeter edge 307e and web 404, seal 408 can also occupy all or part of the gap.

To secure bottom panel 307 to flange part 406b, a weld 410 is positioned at the corner formed by outer side 307o and the end of flange part 406b. In some embodiments only weld 410 need be used, but in embodiments where additional strength is needed in the connection between bottom panel 307 and flange part 406b, in addition to weld 410 a fastener 412 can be inserted through bottom panel 307 and flange part 406b. Still other embodiments can omit weld 410 and use fastener 412 instead.

Figure 5:
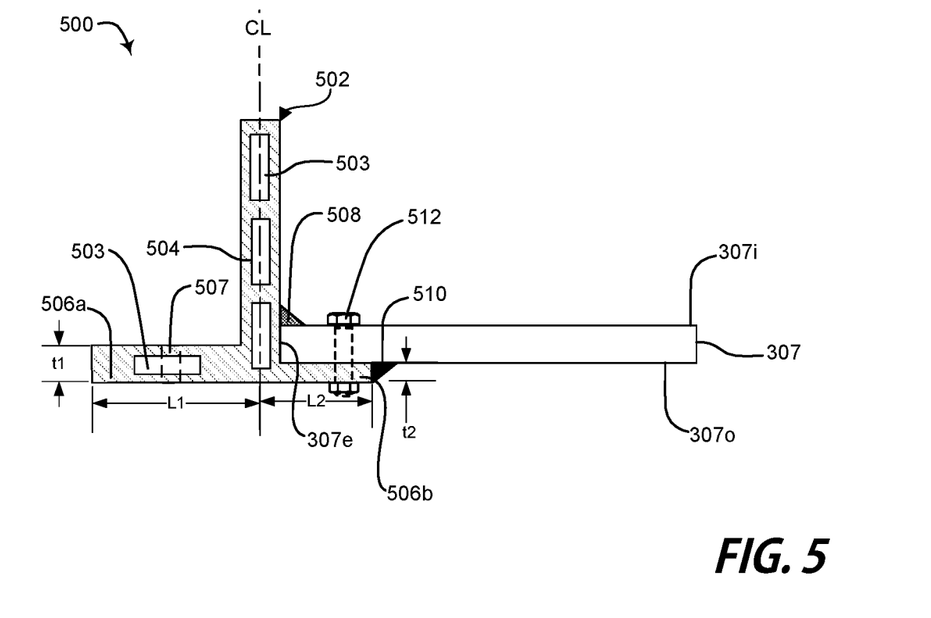
FIG. 5 is a cross sectional view of another embodiment of the rigid frame of the battery enclosure of FIGS. 3A-3C, the cross-section being taken substantially along section line IV-IV in FIG. 3B.

FIG. 5 illustrates an embodiment of a rigid frame 500 that can be used as rigid frame 302 in battery pack 300. Frame 500 has a T-shaped cross section 502 with a web 504 and a flange 506. In one embodiment web 504 can form the sidewall 306 of the battery enclosure, but in other embodiment sidewall 306 can be a separate component attached to web 504 or to some other part of frame 500.

Flange 506 includes a pair of flange parts 506a and 506b that project away from centerline CL of web 502. In the illustrated embodiment, web 504 and flange 506 include hollow chambers 503 that can be used, among other things, to reduce the weight of the frame. Also in the illustrated embodiment, within flange 506 only flange part 506a includes a hollow chamber 503, but in other embodiments both flange parts 506a and 506b can include hollow chambers. In still other embodiments, neither web 504 nor flange 506 need include hollow chambers (see FIG. 4).

In the illustrated embodiment, flange parts 506a and 506b have different lengths: flange part 506a has length L1 and flange part 506b has length L2. In the illustrated embodiment L1 is greater than L2, but in other embodiments L2 can be greater than L1. Flange parts 506a and 506b also have different thicknesses: flange part 506a has thickness t1 and flange part 506b has thickness t2. In the illustrated embodiment t1 is greater than t2, but in other embodiments t2 can be greater than t1. Flange part 506a can include one or more holes 507 that can be used to attach the battery enclosure to a vehicle platform (see FIGS. 1-2) or can be used to attach a lid to battery enclosure (see FIG. 3C).

Bottom panel 307 has an inner side 307i (i.e., a side that forms part of the interior of the battery enclosure) and an outer side 307o (i.e., a side that forms a part of the exterior of the battery enclosure). Outer side 307o rests on flange part 506b so that the perimeter edge 307e of bottom panel 307 abuts web 504 and is positioned in the corner formed by web 504 and flange part 506b. In other embodiments, perimeter edge 307e is positioned in the corner formed by web 504 and flange part 506b but it need not abut web 404, so that there can be a gap between perimeter edge 307e and web 504.

A seal 508 is positioned in the corner formed by web 504 and inner side 307i. In one embodiment seal 508 can be a rubber gasket, O-ring or other type of pre-formed seal, but in other embodiments seal 508 can be formed by dispensing a sealant into the corner and allowing it to dry, harden, and/or cure. In embodiments where there is a gap between perimeter edge 307e and web 504, seal 508 can also occupy all or part of the gap.

To secure bottom panel 307 to flange part 506b, a weld 510 is positioned at the corner formed by outer side 307o and the end of flange part 506b. In some embodiments only weld 510 need be used, but in embodiments where additional strength is needed in the connection between bottom panel 307 and flange part 506b, in addition to weld 510 a fastener 512 can be inserted through bottom panel 307 and flange part 506b. Still other embodiments can omit weld 510 and use fastener 512 instead.

Figure 6:
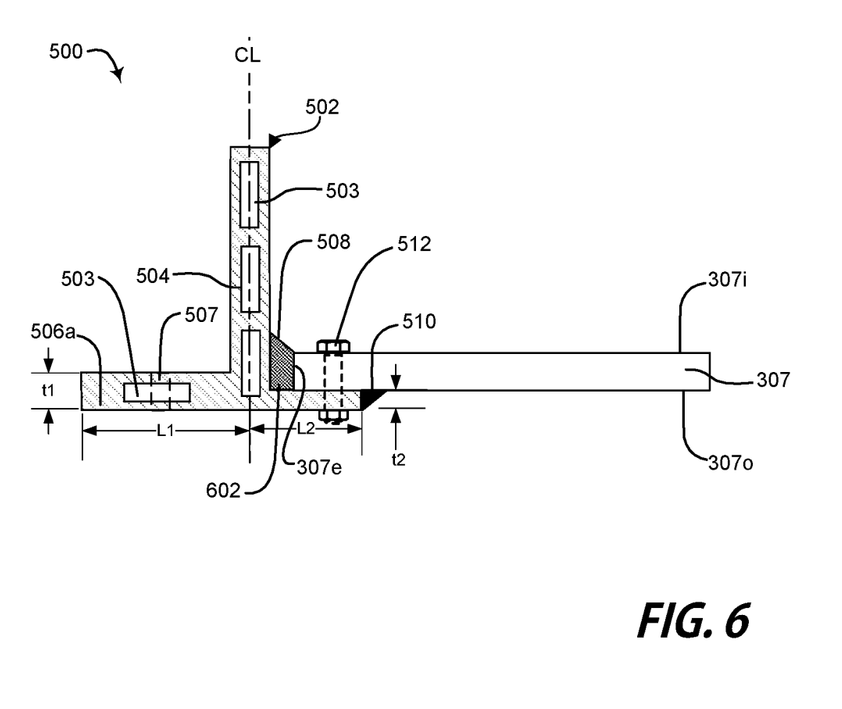
FIG. 6 is a cross sectional view of another embodiment of the rigid frame of the battery enclosure of FIGS. 3A-3C, the cross-section being taken substantially along section line IV-IV in FIG. 3B.

FIG. 6 illustrates an embodiment of a rigid frame 600 that can be used as rigid frame 302 in battery pack 300. Frame 600 is similar to frame 500. The primary difference between frames 500 and 600 is that in frame 600 there is a gap 602 between perimeter edge 307e of bottom panel 307 and web 504—that is, perimeter edge 307e does not abut web 504 and not positioned exactly in the corner formed by web 504 and flange part 506b. In frame 600 seal 508 is now positioned such that it fills all or part of the gap between perimeter edge 307e and web 504 and also creates a corner between inner side 307i and web 504. As in frame 500, in frame 600 seal 508 can be a rubber gasket, O-ring or other type of pre-formed seal, but in other embodiments seal 508 can be formed by dispensing a sealant into the corner and allowing it to dry, harden, and/or cure. In still other embodiments, seal 508 can be seal such as a weld that, in addition to sealing, also provides some structural reinforcement. In some embodiments seal 508 can occupy all or part of the gap without creating a corner between inner side 307i and web 504.

To secure bottom panel 307 to flange part 506b, a weld 510 is positioned at the corner formed by outer side 307o and the end of flange part 506b. In some embodiments only weld 510 need be used, but in embodiments where additional strength is needed in the connection between bottom panel 307 and flange part 506b, in addition to weld 510 a fastener 512 can be inserted through bottom panel 307 and flange part 506b. Still other embodiments can omit weld 510 and use fastener 512 instead. Other embodiments can also use T-shaped cross-section 402 (from FIG. 4) instead of T-shaped cross-section 502.

The above description of embodiments is not intended to be exhaustive or to limit the invention to the described forms. Specific embodiments of, and examples for, the invention are described herein for illustrative purposes, but various modifications are possible.

What is claimed is:

1. A battery enclosure comprising:
    a rigid frame forming a perimeter of the battery enclosure, the rigid frame having a T-shaped cross section including a web and a flange joined to an end of the web, the flange having a pair of flange sections that project away from the centerline of the web;
    a bottom panel having an inner side and an outer side, the bottom panel being positioned within the perimeter formed by the rigid frame so that the outer side of the bottom panel rests on one of the pair of flange sections and so that a perimeter edge of the bottom panel is positioned in a corner formed by the web and the flange section on which the bottom panel rests;
    a seal positioned in the corner formed by the inner side of the bottom panel and the web; and
    a joiner to couple the bottom panel to the flange section on which the bottom panel rests.

2. The battery enclosure of claim 1 wherein the seal is a rubber seal or a dried, hardened, or cured liquid sealant.

3. The battery enclosure of claim 1 wherein there is a gap between the perimeter edge of the bottom panel and the web, and wherein the seal occupies all or part of the gap.

4. The battery enclosure of claim 1 wherein the web, the flange, or both the web and the flange includes at least one hollow chamber.

5. The battery enclosure of claim 1 wherein the joiner is a weld positioned in the corner formed by the outer side of the bottom panel and an end of the flange section on which the bottom panel rests.

6. The battery enclosure of claim 1 wherein the joiner is a fastener that extends through the bottom panel and the flange section on which the bottom panel rests.

7. The battery enclosure of claim 1, further comprising a sidewall formed around the perimeter of the battery enclosure.

8. The battery enclosure of claim 7 wherein the sidewall is formed by the web of the rigid frame.

9. The battery enclosure of claim 7 wherein the sidewall is formed by an element attached to the web of the rigid frame.

10. A system comprising:
    a vehicle platform for an electric vehicle;
    a battery pack coupled to a lower part the vehicle platform, the battery pack including a plurality of battery modules positioned in a battery enclosure, the battery enclosure comprising:
        a rigid frame forming a perimeter of the battery enclosure, the rigid frame having a T-shaped cross section including a web and a flange joined to an end of the web, the flange having a pair of flange sections that project away from the centerline of the web,
        a bottom panel having an inner side and an outer side, the bottom panel being positioned within the perimeter formed by the rigid frame so that the outer side of the bottom panel rests on one of the pair of flange sections and so that a perimeter edge of the bottom panel is positioned in a corner formed by the web and the flange section on which the bottom panel rests,
        a seal positioned in the corner formed by the inner side of the bottom panel and the web, and
        a joiner to couple the bottom panel to the flange section on which the bottom panel rests.

11. The system of claim 10 wherein the pair of flange sections extend equal distances from the centerline of the web.

12. The system of claim 10 wherein there is a gap between the perimeter edge of the bottom panel and the web, and wherein the seal occupies all or part of the gap.

13. The system of claim 10 wherein the seal is a rubber seal or a dried, hardened, or cured liquid sealant.

14. The system of claim 10 wherein the web, the flange, or both the web and the flange includes at least one hollow chamber.

15. The system of claim 10 wherein the joiner is a weld positioned in the corner formed by the outer side of the bottom panel and an end of the flange section on which the bottom panel rests.

16. The system of claim 10 wherein the joiner is a fastener that extends through the bottom panel and the flange section on which the bottom panel rests.

17. The system of claim 10, further comprising a drivetrain coupled to the lower part of the vehicle platform and a vehicle body coupled to an upper part of the vehicle platform.

18. The system of claim 10, further comprising a sidewall formed around the perimeter of the battery enclosure.

19. The system of claim 18 wherein the sidewall is formed by the web of the rigid frame.

20. The system of claim 18 wherein the sidewall is formed by an element attached to the web of the rigid frame.

21. A process comprising:
  coupling a bottom panel to a rigid frame that forms a perimeter of a battery enclosure, wherein:
    the rigid frame has a T-shaped cross section including a web and a flange joined to an end of the web, the flange having a pair of flange sections that project away from the centerline of the web,
    the bottom panel has an inner side and an outer side and is positioned within the perimeter formed by the rigid frame so that the outer side of bottom panel rests on one of the pair of flange sections and so that a perimeter edge of the bottom panel is positioned in a corner formed by the web and the flange section on which the bottom panel rests,
    a seal is positioned in the corner formed by the inner side of the bottom panel and the web; and
    a joiner couples the bottom panel to the flange section on which the bottom panel rests.

22. The process of claim 21 wherein there is a gap between the perimeter edge of the bottom panel and the web, and wherein the seal occupies all or part of the gap.

23. The process of claim 21 wherein the seal is a rubber seal or a dried, hardened, or cured liquid sealant.

24. The process of claim 21 wherein the web, the flange, or both the web and the flange includes at least one hollow chamber.

25. The process of claim 21 wherein the joiner is a weld positioned in the corner formed by the outer side of the bottom panel and an end of the flange section on which the bottom panel rests.

26. The process of claim 21 wherein the joiner is a fastener that extends through the bottom panel and the flange section on which the bottom panel rests.

* * * * *